United States Patent [19]

Taniai et al.

[11] Patent Number: 5,119,487
[45] Date of Patent: Jun. 2, 1992

[54] DMA CONTROLLER HAVING PROGRAMMABLE LOGIC ARRAY FOR OUTPUTTING CONTROL INFORMATION REQUIRED DURING A NEXT TRANSFER CYCLE DURING ONE TRANSFER CYCLE

[75] Inventors: Takayoshi Taniai, Kawasaki; Yasuhiro Tanaka, Koshigaya; Tadashi Saitoh, Kawasaki, all of Japan

[73] Assignees: Fujitsu Limited; Fujitsu Microcomputer Systems Limited, both of Kawasaki, Japan

[21] Appl. No.: 306,952

[22] Filed: Feb. 7, 1989

[30] Foreign Application Priority Data

Feb. 8, 1988 [JP] Japan ................. 63-27007
Feb. 8, 1988 [JP] Japan ................. 63-27008

[51] Int. Cl.⁵ ........................... G06F 12/06
[52] U.S. Cl. ..................... 395/425; 364/DIG. 1; 364/244.9; 364/242.31; 364/238.4; 364/240
[58] Field of Search ... 364/200 MS File, 900 MS File

[56] References Cited

U.S. PATENT DOCUMENTS

| | | | |
|---|---|---|---|
| 4,348,720 | 9/1982 | Blahut et al. | 364/200 |
| 4,722,051 | 1/1988 | Chattopadhya | 364/200 |
| 4,791,603 | 12/1988 | Henry | 364/900 |
| 4,797,851 | 1/1989 | Suzuki | 364/900 |
| 4,805,137 | 2/1989 | Grant et al. | 364/900 |
| 4,821,180 | 4/1989 | Gerety et al. | 364/200 |
| 4,924,427 | 5/1990 | Savage et al. | 364/900 |

Primary Examiner—Thomas C. Lee
Assistant Examiner—Mehmet Geckil
Attorney, Agent, or Firm—Armstrong, Nikaido, Marmelstein, Kubovcik & Murray

[57] ABSTRACT

A direct memory access controller coupled to a system bus for controlling a data transfer by a direct memory access comprises an internal bus, a data handler coupled to the system data bus and the internal bus for controlling an exchange of data between the system bus and the internal bus, a microsequencer which controls by microprograms parts of the direct memory access controller in units of one system clock cycle during one present transfer cycle, and a programmable logic array part supplied with a transfer request, a transfer mode information and at least portions of a transfer address and a byte count. The programmable logic array part is coupled to the internal bus and outputs control information required during a next transfer cycle during one transfer cycle which corresponds to a predetermined number of system clock cycles. Each data transfer between the input/output device and the memory device is controlled by the microprograms of the microsequencer in cooperation with the programmable logic array part.

21 Claims, 6 Drawing Sheets

DMA CONTROLLER HAVING PROGRAMMABLE LOGIC ARRAY FOR OUTPUTTING CONTROL INFORMATION REQUIRED DURING A NEXT TRANSFER CYCLE DURING ONE TRANSFER CYCLE

BACKGROUND OF THE INVENTION

The present invention generally relates to direct memory access (DMA) controllers, and more particularly to a direct memory access controller for controlling a direct memory access in which data is transferred directly between a memory device and an input/output device at a high speed during a time when a central processing unit forfeits exclusive right to a system bus of a data processing apparatus having the central processing unit.

Conventionally, a DMA controller controls a data transfer in conformance with a DMA by microprograms or a random logic. However, the conventional DMA only requires relatively simple control of the address and control of the byte for determining a byte to which an access is to be made because a bit length of the data transfer is eight or sixteen bits which is relatively small. For this reason, a decrease in a data transfer speed due to the use of the microprograms for the DMA control and an increase in the hardware due to the use of the random logic for the DMA control do not cause serious problems.

But in recent DMA, the bit length of the data transfer is becoming large such as thirty-two bits. As a result, the address control, the byte control, and a control of the generation of control signals for carrying out these controls are becoming extremely complex. When combinations of port size, operand size, misalignment and the like are considered, a DMA controller for controlling a DMA with a bit length of thirty-two bits must control over four thousand different combinations of data transfers. The port size in this case means the physical bit length of peripheral input/output devices, and the operand size means a logical bit length of the peripheral input/output devices.

Accordingly, when the bit length of the data transfer is large such as thirty-two bits, for example, the use of the microprograms for the DMA control results in a large number of program steps because of complex condition discriminations and there is a problem in that the data transfer speed becomes slow since it takes considerable time to make the condition discriminations. On the other hand, when the random logic is used for the DMA control, the scale of the hardware becomes extremely large and there is a problem in that it is very difficult to correct the logic when an error exists in the logic design.

FIG. 1 shows an essential part of a conventional DMA controller which uses microprograms for the DMA control. The conventional DMA controller includes a request controller 10, a microsequencer 11 which stores microprograms, an address register 12, and a bus controller 13.

When a transfer request is received at the request controller 10 through a terminal 14, the bus controller 13 outputs through a terminal 15 a signal for controlling a system bus (not shown) such as a read/write signal responsive to an instruction from the request controller 10. On the other hand, the address register 12 outputs an address through a terminal 16 responsive to the instruction from the request controller 10 and generates a next address by a count-up operation. The microsequencer 11 generates and outputs an information for controlling the data transfer responsive to the request from the request controller 10.

According to this conventional DMA controller, it is necessary to freely control a count-up value of the address register 12. However, the control of the count-up value becomes complex especially when the bit length of the data transfer is large, and there is a problem in that the number of program steps further increases when this control is carried out by the microsequencer 11.

SUMMARY OF THE INVENTION

Accordingly, it is a general object of the present invention to provide a novel and useful DMA controller in which the problems described heretofore are eliminated.

Another and more specific object of the present invention is to provide a DMA controller coupled to a system bus for controlling a data transfer by a direct memory access comprising an internal bus, a data handler coupled to the system data bus and the internal bus for controlling an exchange of data between the system bus and the internal bus, a microsequencer which controls by microprograms parts of the direct memory access controller in units of one system clock cycle during one present transfer cycle, and a programmable logic array part supplied with a transfer request, a transfer mode information and at least portions of a transfer address and a byte count, the programmable logic array part being coupled to the internal bus and outputting control information required during a next transfer cycle during one transfer cycle which corresponds to a predetermined number of system clock cycles, where each data transfer between the input/output device and the memory device is controlled by the microprograms of the microsequencer in cooperation with the programmable logic array part. According to the DMA controller of the present invention, it is possible to reduce the load on the microsequencer for making the condition discriminations by the microprograms and also prevent the the scale of hardware of the random logic from becoming large. Hence, it is possible to make the data transfer at a high speed even when the bit length of the data transfer.

Other objects and further features of the present invention will be apparent from the following detailed description when read in conjunction with the accompanying drawings.

DETAILED DESCRIPTION

Figure 1:
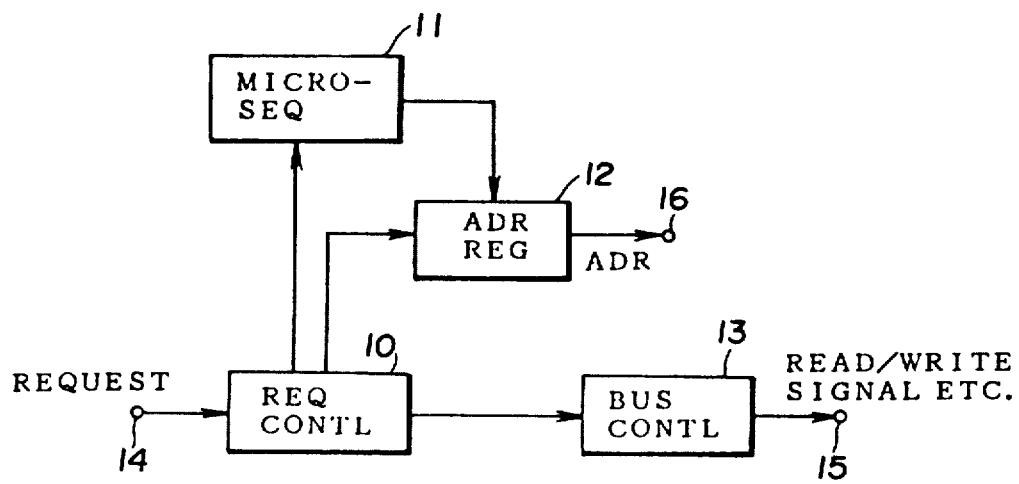
FIG. 1 is a system block diagram showing an essential part of a conceivable DMA controller.
Figure 2:
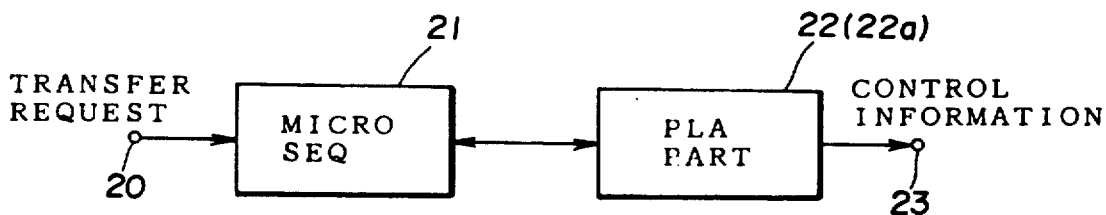
FIG. 2 is a system block diagram showing an essential part of a DMA controller according to the present invention for explaining an operating principle of the present invention.

FIG. 2 shows an essential part of a DMA controller according to the present invention for explaining an operating principle of the present invention. The DMA controller includes a microsequencer 21 and a programmable logic array (hereinafter simply referred to as a PLA) part 22. The PLA part 22 is constituted by a PLA 22a.

The microsequencer 21 is microprogrammed to control each part of the DMA controller in units of one system clock cycle during a present transfer cycle responsive to a transfer request from a terminal 20. The PLA part 22 generates a control information required during a next transfer cycle during a transfer cycle corresponding to a predetermined number of system clock cycles responsive to input conditions received from the microsequencer 21. The control information is outputted through a terminal 23. A data transfer by the DMA is controlled by the microprograms of the microsequencer 21 and a random logic of the programmable logic array (PLA) part 22.

Figure 3:
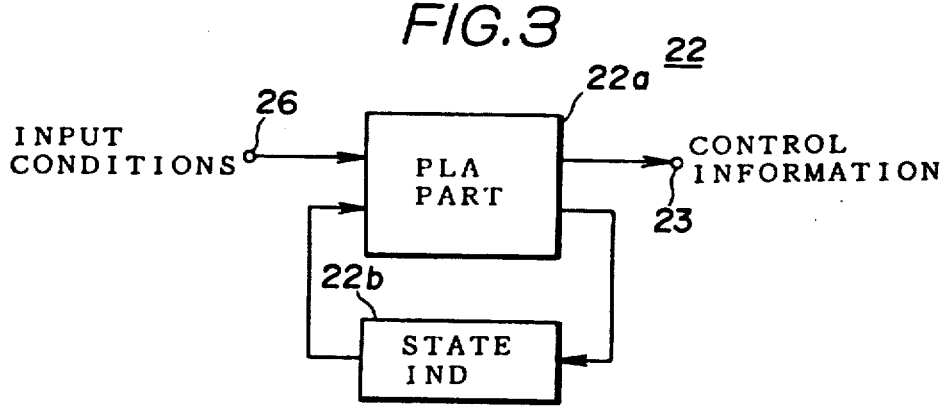
FIG. 3 is a system block diagram showing another essential part of the DMA controller according to the present invention for explaining the operating principle of the present invention.

A state indication circuit 22b may be coupled to the PLA 22a to constitute the PLA part 22 as shown in FIG. 3. The PLA 22a generates the control information responsive to the input conditions received through a terminal 26. Based on an output of the PLA 22a, the state indication circuit 22b renews an information which instructs a next transfer state and supplies this information to the PLA 22a. The PLA 22a successively generates the control information by using the information from the state indication circuit 22b as a part of the input conditions.

Accordingly, it is possible to reduce a load on the microsequencer 21 for making the condition discriminations by the microprograms and also prevent the scale of the hardware of the random logic from becoming extremely large. Therefore, it is possible to make the data transfer at a high speed even when the bit length of the data transfer is large.

Figure 4:
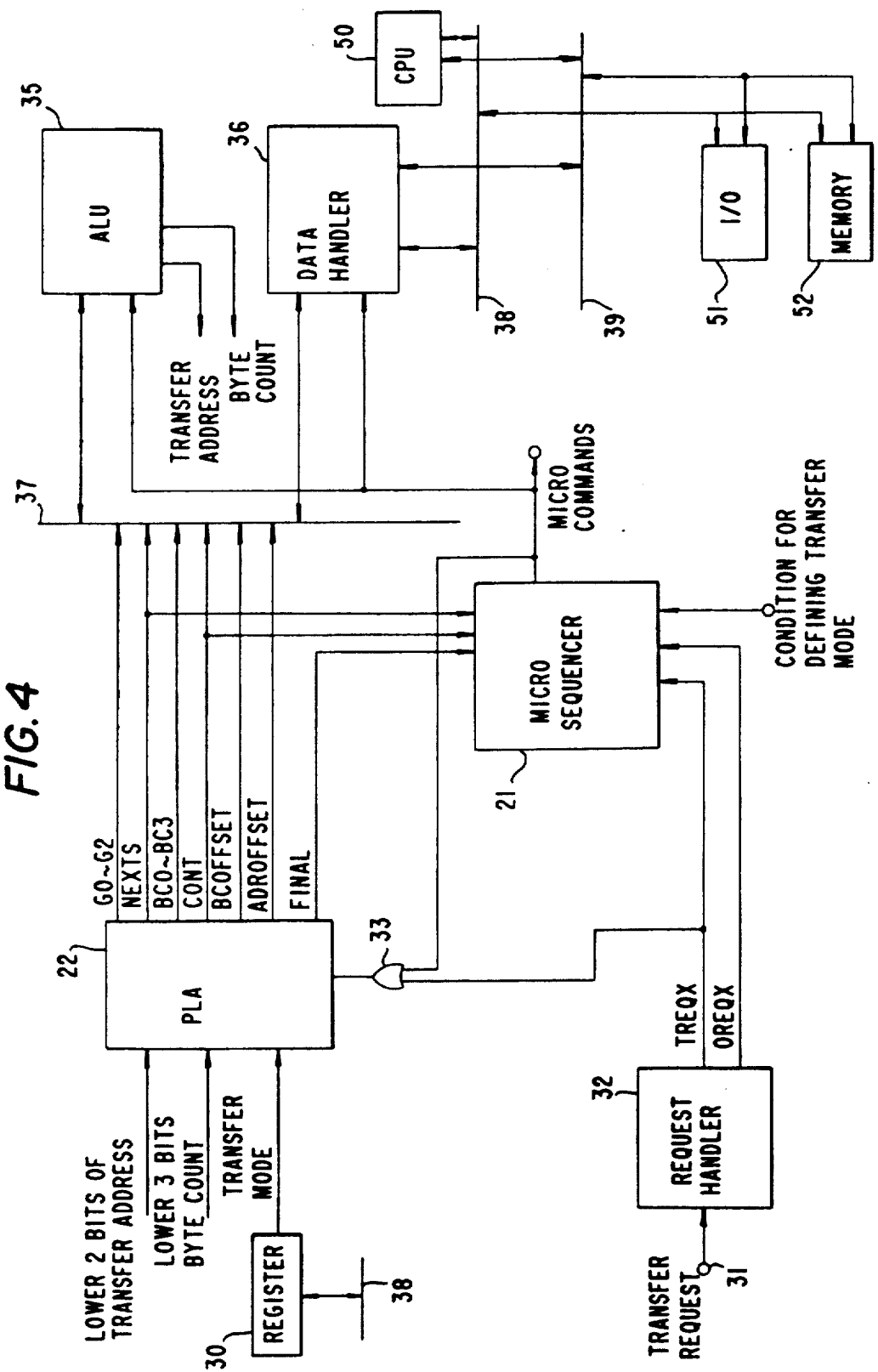
FIG. 4 is a system block diagram showing a first embodiment of the DMA controller according to the present invention.

FIG. 4 shows a first embodiment of the DMA controller according to the present invention. The DMA controller includes a transfer mode register 30, the PLA part 22 for gate control, a request handler 32, an OR circuit 33, the microsequencer 21, an arithmetic logic unit (hereinafter simply referred to as an ALU) 35, a data handler 36, an internal data bus 37, a system data bus 38, and a system address bus 39. In this embodiment, the PLA part 22 is constituted solely by the PLA 22a. The OR circuit 33 may be considered as being a part of the PLA part 22.

A central processing unit (hereinafter simply referred to as a CPU) 50, at least one input/output device 51, at least one memory device 52 and the like of the data processing apparatus are coupled to the system data bus 38 and the system address bus 39.

The transfer mode register 30 is used for registering transfer modes such as burst, single, dual and cycle steal modes. This transfer mode register 30 is coupled to the system data bus 38.

The PLA part 22 is supplied with a transfer mode from the transfer mode register 30, lower two bits of a transfer address from the ALU 35, and lower three bits of a byte count from the ALU 35. An output of the PLA part 22 is supplied to the microsequencer 21 and the internal data bus 37 as will be described later in the specification.

An external transfer request from outside the DMA controller is received at a terminal 31 and is supplied to the request handler 32 which carries out various operations including determination of priorities of the transfer requests, starting an internal process of the DMA controller to inform the transfer request to each part of the DMA controller and the like. The request handler 32 supplies to the OR circuit 33 and the microsequencer 21 a transfer request signal TREQX for starting the internal process of the DMA controller. The request handler 32 also supplies to the microsequencer 21 a process request OREQX which is other than the transfer request, such as an external abort request, received from outside the DMA controller.

Microprograms are stored within the microsequencer 21, and various kinds of microcommands are supplied to the OR circuit 33, the ALU 35 and the data handler 36 to control the PLA part 22, the ALU 35 and the data handler 36. The microsequencer 21 also stores conditions for defining the transfer modes.

The ALU 35 outputs the next transfer address and the byte count. Since the user instructs beforehand an arbitrary number of bytes to be transferred, the ALU 35 renews the byte count when one transfer is completed and obtains by calculation how many bytes still need to be transferred. The ALU 35 is coupled to the internal data bus 37.

The data handler 36 is coupled to the system data bus 38, the system address bus 39, and the internal data bus 37. The data handler 36 controls the exchange of data between the system data bus 38 and the internal data bus 37, and generates a hold request and the like of the CPU 50.

Next, a description will be given of the operation of an essential part of the first embodiment. The PLA 22 discriminates the existence or non-existence of a misalignment of the address to which the transfer is to be made based on the lower three bits of the byte count and the lower two bits of the transfer address obtained from the ALU 35. 3-bit gate information G0 through G2 and 4-bit byte control information BC0 through BC3 outputted from the PLA part 22 are used when rearranging the data in a byte swapper (not shown) within the data handler 36. The rearranging of the data includes assembling, disassembling and the like. A 1-bit next side information NEXTS outputted from the PLA part 22 indicates whether the transfer is a transfer process of a source device or a transfer process of a destination device. The next side information NEXTS is supplied to the microsequencer 21 and also to the data handler 36 through the internal data bus 37.

A 1-bit continue information CONT outputted from the PLA part 22 indicates a repetition of a process which is presently being carried out. The user only makes one transfer request. However, there are cases where two transfers are required by the source device and the destination device and the continue information CONT is used for this reason. A 1-bit address offset information ADROFFSET and a 1-bit byte count offset information BCOFFSET outputted from the PLA part 22 are offset information for calculating the next transfer address and the adding or subtracting value of the byte count when carrying out the addition or subtraction in the ALU 35. A 1-bit final information FINAL outputted from the PLA part 22 indicates a final transfer which is presently carried out. When the address to which the transfer is to be made is misaligned, there is no guarantee that the transfer will be completed in one transfer cycle. Hence, the final information FINAL is supplied to the microsequencer 21 to instruct the final transfer. Out of the signals outputted from the PLA part 22, the final information FINAL, the byte control information BC0 through BC3 and the continue information CONT are supplied to the microsequencer 21.

Figure 5:
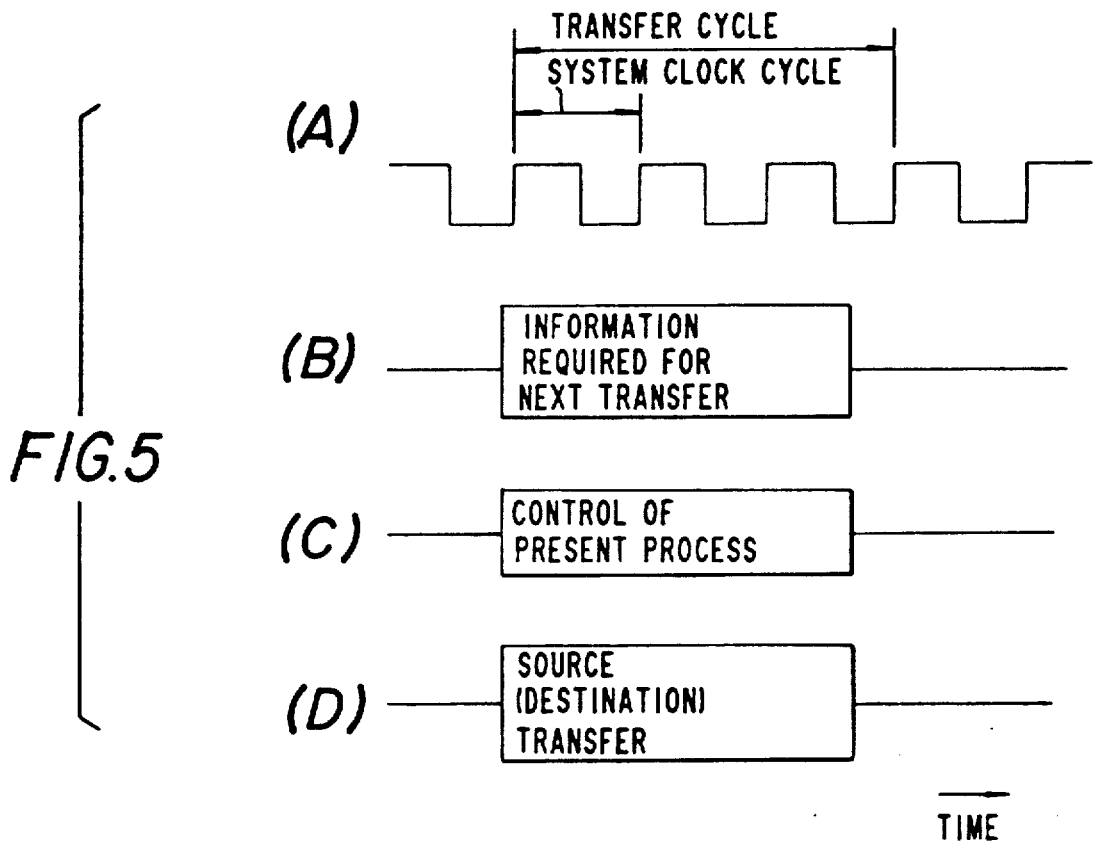
FIGS. 5(A) through 5(D) are timing charts for explaining the operation of the first embodiment.

FIGS. 5(A) through 5(D) are timing charts for explaining the operating timings of an essential part of the first embodiment. FIG. 5(A) shows a system clock signal CLK. FIG. 5(B) shows a process timing of the PLA part 22. FIG. 5(C) shows a process timing of the microsequencer 21, and FIG. 5(D) shows a process timing of the data handler 36. For convenience' sake, it is assumed in FIGS. 5(A) through 5(D) that one transfer cycle (one bus cycle) corresponds to three clock cycles of the system clock signal CLK (that is, three system clock cycles).

Accordingly, the PLA part 22 basically outputs control information required for the next transfer in units of one transfer cycle except for the final information FINAL and the like which are information related to the present transfer.

On the other hand, the microsequencer 21 carries out a control including a control to determine how to use the internal data bus 37 during the present transfer in each system clock cycle. In other words, the microsequencer 21 controls each part of the DMA controller during the one present transfer cycle. In addition, the data handler 36 carries out the data transfer between the source device and the destination device during one transfer cycle.

Generally, when carrying out the data transfer by the DMA, the transfer is made after writing information such as the transfer address for making the first transfer and the transfer mode. Hence, it is possible to anticipate beforehand what kind of transfer is to be made. In this embodiment, the PLA part 22 anticipates the information necessary for the next transfer in units of one transfer cycle so as to reduce the load on the microsequencer 21 for discriminating the conditions by use of the microprograms. Therefore, it is possible to make the data transfer at a high speed even when the bit length of the data transfer is large.

Next, a description will be given of a second embodiment of the DMA controller according to the present invention. In this embodiment, the block system is identical to that shown in FIG. 4 but the PLA part 22 includes the PLA 22a and the state indication circuit 22b as described before in conjunction with FIG. 3. The construction of the PLA part 22 constitutes an essential part of this embodiment. It is also possible in this case to consider the OR circuit 33 as being a part of the PLA part 22.

When making the data transfer by the DMA, are usually the processes carried out in sequential order, after the initial conditions are set. However, when the bit length of the data transfer is large and also when the scale of the system (data processing apparatus) as a whole is large, the initial conditions are complex. Thus, in this embodiment, the complex input conditions are processed by use of the PLA 22a which can process these conditions relatively easily. Furthermore, the state indication circuit 22b is provided for carrying out the sequential processes so as to renew the next transfer state based on an output of the PLA 22a and supply the renewed transfer state to the PLA 22a. Accordingly, the PLA 22a successively generates the control information by using the information from the state indication circuit 22b as a part of the input conditions. In other words, the next transfer state is determined with reference to the output information of the state indication circuit 22b.

For example, a state counter may be used for the state indication circuit 22b. This state counter does not require a special circuit such as an adder, and simply needs to be a circuit such as a latch circuit for renewing the value based on the output of the PLA 22a. Thus, the content of the state counter does not necessarily have to be an increasing or decreasing number and may be a code or the like which indicates a certain state. As a result, the process depending on the more complex conditions, that is, the control of the data transfer, can be carried out with ease.

Figure 6:
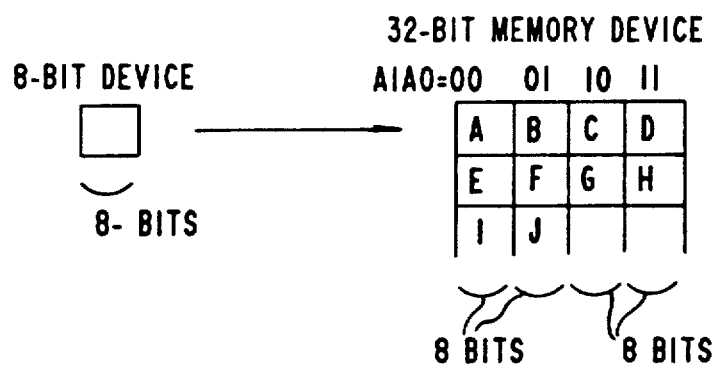
FIG. 6 is a diagram for explaining a data transfer to a memory device in a second embodiment of the DMA controller according to the present invention.

Next, a description will be given of the operation of the PLA part 22 of the second embodiment when a data transfer is made from an 8-bit device (not shown) such as an input/output device which outputs eight bits of data at one time to a 32-bit memory device (not shown). In this case, the 8-bit device outputs the data in four divisions as data portions A, B, C and D. These data portions A, B, C and D are written at the addresses of the 32-bit memory device as shown in FIG. 6 and the data transfer of the 32-bit data is completed. A next 32-bit data is similarly written into the 32-bit memory device as data portions E, F, G and H, and the data transfer is carried out similarly thereafter.

The characterizing part of the processing of the data portions A, B, C and D, for example, is the value of the two least significant bits A1 and A0 of the address of the data which is divided in portions of eight bits. Accordingly, the process on the data portion A having the address in which the two least significant bits A1 and A0 are identical values is the same as the process on the data portion E having the address in which the two least significant bits b1 and b0 are identical values. Hence, when four kinds of processes are prepared in the case shown in FIG. 6, it may be seen that each 32-bit data can be transferred to the 32-bit memory device by sequentially repeating the four kinds of processes.

When state indication numbers "0", "1", "2" and "3" are assigned to the processes of the data portions A, B, C and D, for example, an initial value of the state indication circuit 22b (state counter) is first set to the state indication number "0". Then, the data portion A is transferred to the 32-bit memory device based on the control information for the data portion A generated and outputted from the PLA 22a responsive to the input conditions and the state indication number "0" received from the state indication circuit 22b. Next, the PLA 22a generates and outputs the control information for the data portion B responsive to the input conditions and the state indication number "1" received from the state indication circuit 22b. Thus, the data portion B is transferred to the 32-bit memory device based on the output control information of the PLA 22a, and at the same time, the state indication number "2" is obtained from the PLA 22a and set in the state indication circuit 22b. When the state indication number set in the state indication circuit 22b becomes "3", the state indication number is then returned to "0" and the operation is carried out similarly thereafter. Therefore, it is possible to transfer to the 32-bit memory device the data made up of the data portions A, B, C and D, the data portions E, F, G and H and the like.

According to this embodiment, it is possible to successively supply the information which indicates the next transfer state to the PLA 22a without using a complex circuit such as an arithmetic logic unit (ALU), and it is possible to control a complex data transfer without increasing the load on the microsequencer 21 for discriminating the conditions. In addition, the DMA controller can easily cope with a design modification of the system (data processing apparatus) with a high flexibility.

Figure 7:
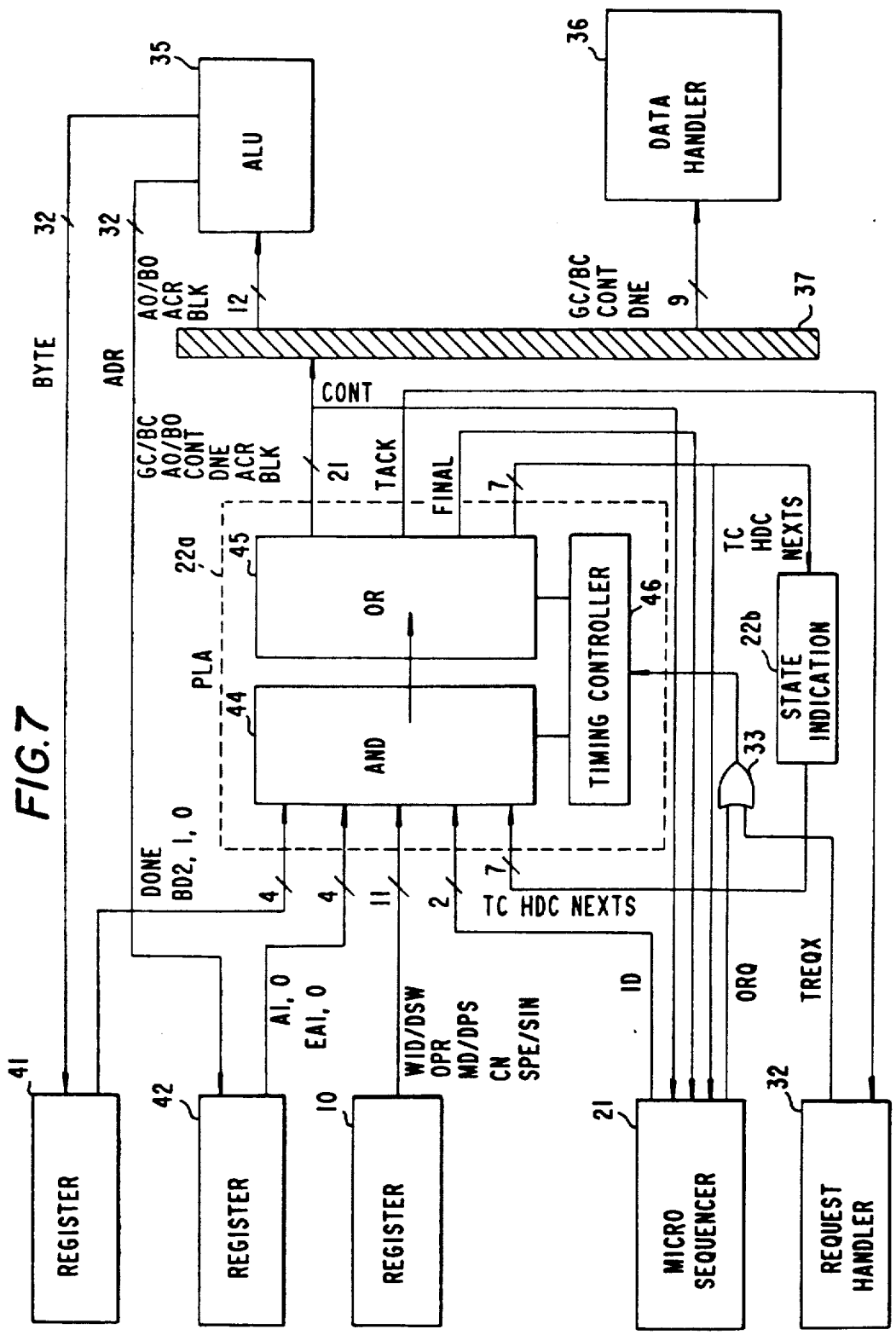
FIG. 7 is a system block diagram showing a third embodiment of the DMA controller according to the present invention.

Next, a description will be given of a third embodiment of the DMA controller according to the present invention, by referring to FIG. 7. In FIG. 7, those parts which are basically the same as those corresponding parts in FIG. 4 are designated by the same reference numerals, and a description thereof will be omitted. In FIG. 7, the DMA controller includes in addition to those elements shown in FIG. 4 a byte count register 41 and a transfer address register 42. The PLA part 22a has an AND circuit part 44, an OR circuit part 45 and a timing controller 46. The illustration of the system data and address buses, the CPU, the input/output device, the memory device and the like are omitted in FIG. 7.

The byte count register 41 stores the remaining byte count during the data transfer. Every time one transfer is made, the ALU 35 decrements the byte count stored in the byte count register 41. The transfer address register 42 stores the address value of the data which is presently being transferred. The renewal of the address value stored in the transfer address register 42 is dependent on the transfer mode. As described before, the transfer mode register 10 stores various information for the data transfer, and the microsequencer 21 controls the entire operation of the DMA controller by the microprograms. The state indication circuit 22b stores the state indication number (or state variable) for sequentially operating the PLA 22a. The internal data bus 37 is used for transferring internal information such as transferring the output data of the PLA 22a to the data handler 36. The ALU 35 carries out an addition or subtraction of the address and the byte count. The data handler 36 controls the exchange of signals between the DMA controller and external devices outside the DMA controller.

When the byte count in the byte count register 41 becomes "7" in this embodiment, a signal DONE is supplied to the PLA 22a to enter a transfer end operation. Lower three bits BD2, BD1 and BD0 of the byte count are also supplied from the byte count register 41 to the PLA 22a. The PLA 22a refers to these lower three bits BD2, BD1 and BD0 when the signal DONE is received so as to provide for the transfer end operation.

Lower two bits b1 and b0 of an initial value of the data address at the side (source or destination) which is presently making the data transfer are supplied from the transfer address register 42 to the PLA 22a. In addition, lower two bits EA1 and EA0 of an initial value of the data address at the side which is presently not making the data transfer are supplied from the transfer address register 42 to the PLA 22a, but the PLA 22a refers to these lower two bits EA1 and EA0 only when making a special transfer. In other words, the lower two bits EA1 and EA0 are normally not used.

Signals WID/DSW OPR, MD/DPS, CN and SPE/SIN are supplied from the transfer mode register 10 to the PLA 22a. The signals WID/DSW indicate the bus width, where the signal WID indicates the width of the bus used for a normal transfer and DSW indicates the bus width of a bus on which a descriptor exists. The signal OPR indicates the operand size in two bits so that "00" indicates a byte operand, "01" indicates a half word operand, "10" indicates a word operand and "11" indicates a long word operand, for example. The signals MD/DPS indicate the kind of device and the port size. The signal MD indicates whether the device is a memory device or an input/output device, and the signal DPS indicates the port size in two bits so that "00" instructs an 8-bit port, "01" indicates a 16-bit port and "10" indicates a 32-bit port. The signal DPS is neglected when the signal MD instructs the memory device. The signal CN indicates the renewal direction of the address in two bits so that "00" indicates a fixed address, "01" indicates an increasing address and "10" indicates a decreasing address. The signals SPE/SIN respectively indicate a special transfer mode and a single transfer mode.

A signal ID supplied to the PLA 22a from the microsequencer 21 indicates a process mode in two bits so that "00" indicates a normal transfer, "01" indicates an initialization, "10" indicates a chain mode and "11" indicates an exception processing. Signals TC, HDC and NEXTS are supplied from the state indication circuit 22b to the PLA 22a. The signal TC keeps the count of the number of transfers of unit data in three bits and makes the PLA 22a operate like the microsequencer 21. The signal HDC keeps the count of the number of data stored in a temporary register (not shown) within the state indication circuit 22b in three bits. The signal NEXTS corresponds to the information NEXTS of the first and second embodiments. This signal NEXTS indicates whether the transfer will next be carried out by the source device or the destination device.

The PLA 22a outputs the following signals GC/BC, A0/B0, CONT, DNE, ACR, BLK, TACK, FINAL, TC, HDC and NEXTS. The signals GC/BC respectively correspond to the information G0 through G2 and the information BC0 through BC3 of the first and second embodiments. The signals GC/BC respectively are 3-bit and 4-bit gate control signals for the data swapper within the data handler 22. The signals A0/B0 respectively correspond to the information ADROFFSET and BCOFFSET. The signal A0 is a 7-bit signal which indicates an offset value for renewing the transfer address, and the signal B0 is a 3-bit signal which indicates an offset value for renewing the byte count. The signal CONT instructs an automatic continuation of the bus cycle. The signal DNE indicates a cycle in which the signal DONE may interrupt during the transfer. The signal ACR instructs a clearing of the transfer address during a special transfer. The signal BLK instructs a batch transfer mode. The signal TACK instructs an output enable of the next request to the request handler 32. The signal FINAL instructs an end of the transfer of one data block to the microsequencer 21. The instructions of the signals TC, HDC and NEXTS are the same as those of the signals TC, HDC and NEXTS received from the state indication circuit 22b. The signals CONT and NEXTS are also supplied to the microsequencer 21.

When the OR circuit 33 supplies to the timing controller 46 of the PLA 22a a request TREQX from the request handler 32 or a request ORQ from the microsequencer 21, the timing controller 46 supplies to the AND circuit part 44 and the OR circuit part 45 of the PLA 22a a control signal for reading out the signals from the PLA 22a. The OR circuit 33 supplies the request TREQX during the normal transfer and supplies the request ORQ during the initial setting, the exception processing and the like. The request ORQ is obtained from the microsequencer 21 which processes the request TREQX received from the request handler 32 into the request ORQ.

A 32-bit signal BYTE outputted from the ALU 35 is the byte count which is returned to the byte count register 41. The byte count is renewed with every transfer cycle. A 32-bit signal ADR outputted from the ALU 35 is the transfer address returned to the transfer address register 42. The transfer address is renewed with every transfer cycle when a setting is made to renew the transfer address.

Figure 8:
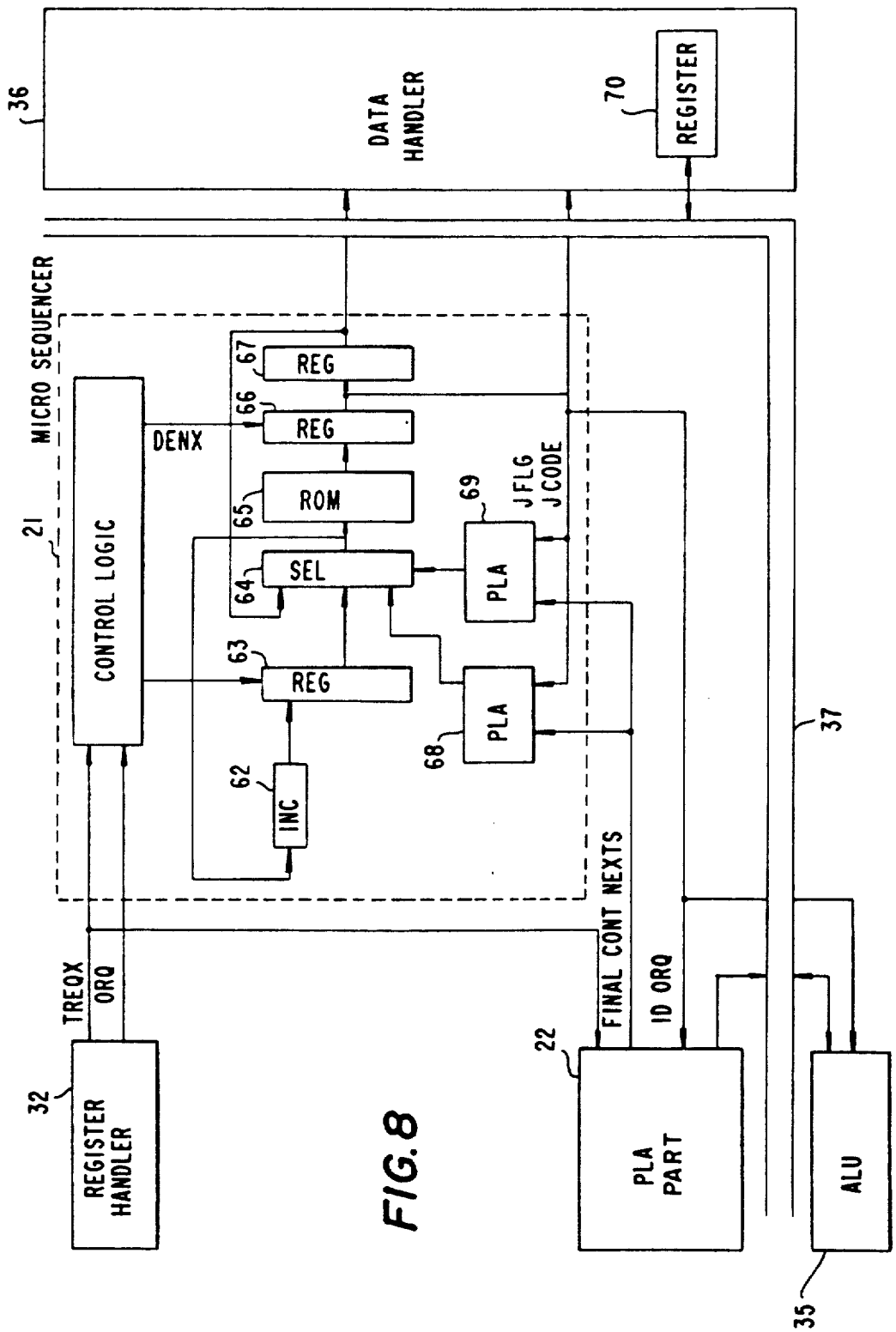
FIG. 8 is a system block diagram showing an embodiment of a microsequencer together with an essential part of the DMA controller.

FIG. 8 shows an embodiment of the microsequencer 21 together with an essential part of the DMA controller. This microsequencer 21 is applicable to all of the first through third embodiments described heretofore. In FIG. 8, those parts which are basically the same as those corresponding parts in FIGS. 4 and 7 are designated by the same reference numerals, and a description thereof will be omitted. The illustration of the OR circuit 33 and the like is omitted.

In FIG. 8, the microsequencer 21 has a control logic part 61, an incrementing part 62, an address register 63, a selector 64, a read only memory (ROM) 65, data registers 66 and 67, and PLAs 68 and 69 which are connected as shown. The data handler 36 has a register 70 for storing the control information such as the source and destination addresses.

Figure 9:
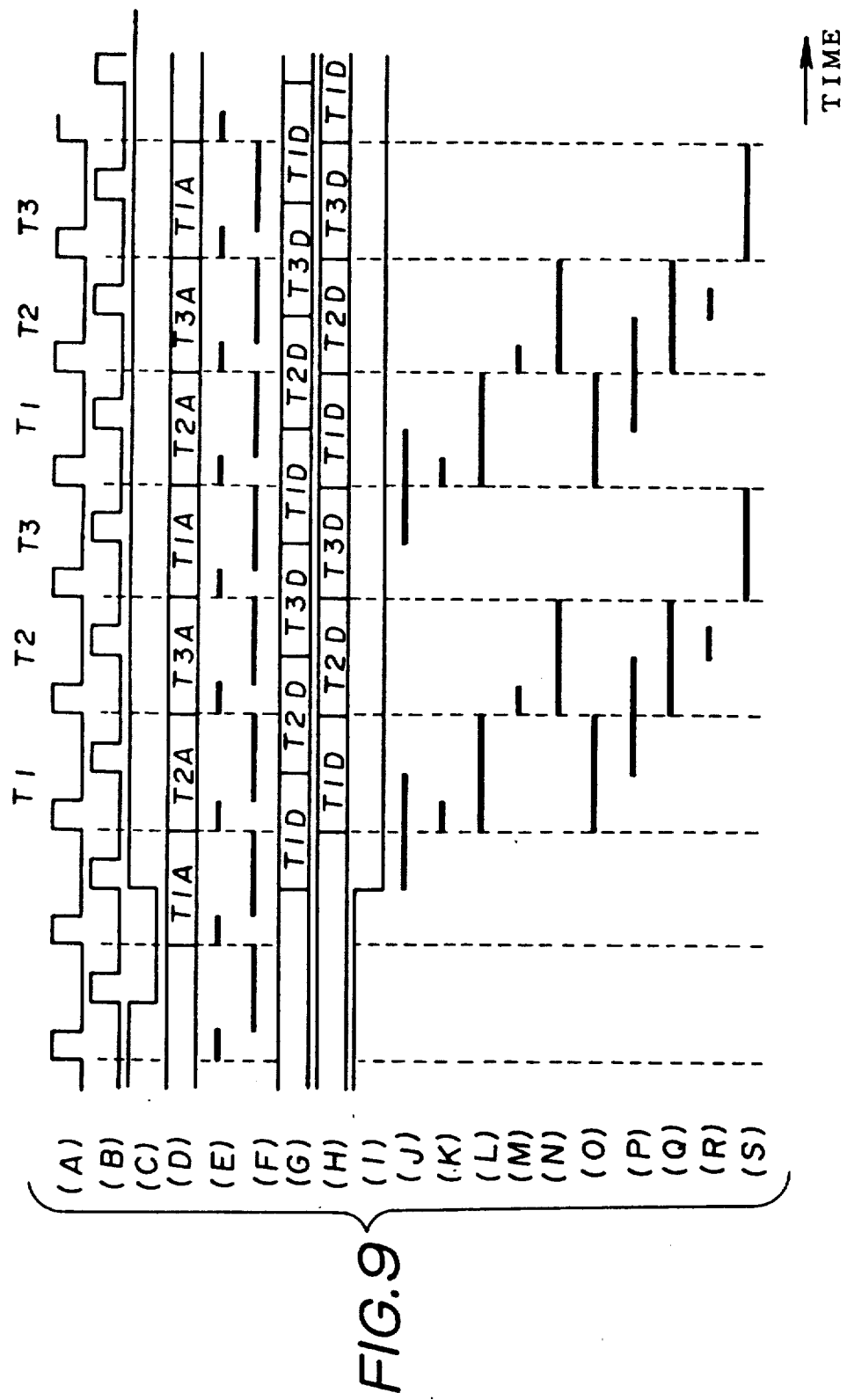
FIGS. 9(A) through 9(S) are timing charts for explaining the operation of the block system shown in FIG. 8.

FIGS. 9(A) through 9(S) are timing charts for explaining the operation of the block system shown in FIG. 8. FIGS. 9(A) and 9(B) respectively show first and second clock signals $\phi 1$ and $\phi 2$. Pulses of the first clock signal $\phi 1$ and pulses of the second clock signal $\phi 2$ have no overlap. FIG. 9(C) shows the signal TREQX which is outputted from the request handler 32 to start the microsequencer 21, and FIG. 9(D) shows the address supplied to the ROM 65. FIGS. 9(E) and 9(F) respectively show the precharge timing and the discharge timing of the ROM 65. FIGS. 9(G) and 9(H) respectively show the outputs of the data registers 66 and 67. FIG. 9(I) shows a data enable signal DENX supplied to the data register 66 from the control logic part 61.

FIG. 9(J) shows an output timing of a signal which is one of the microcommands outputted from the data register 66 and is especially related to an input latch of the ALU 35. FIG. 9(K) shows a timing with which the data is latched in the input latch of the ALU 35. FIG. 9(L) shows a timing with which the ALU 35 carries out an addition, FIG. 9(M) shows a timing with which a calculation result of the ALU 35 is latched in an output latch of the ALU 35, and FIG. 9(N) shows a timing with which an output of the output latch of the ALU 35 is transferred to the data handler 36 through the internal data bus 37. A latch enable signal is instructed by the microcommand and is used in the data handler 36 as a signal for entering the information on the internal data bus 37. FIG. 9(O) shows a timing with which the information from the PLA part 22 is transferred to the data handler 36 through the internal data bus 37. FIG. 9(P) shows a timing for instructing the condition discrimination by the microcommands, namely, by a jump flag JFLG and a jump code JCODE. A jump destination address is outputted if necessary. FIG. 9(Q) shows a timing for making the condition discrimination such as generating a selector switching information based on the input at the PLA 69 and if necessary generating the jump destination address in the PLA 68 based on the jump code JCODE and the conditions. FIG. 9(R) shows a timing with which the outputs of the PLAs 68 and 69 are latched. FIG. 9(S) shows a timing with which the selector 64 is switched. Depending on the output information of the PLA 69, the output of the incrementing part 62, the PLA 68 or the address register 63 is used as a next read-out address of the ROM 65. Normally, the output of the incrementing part 62 is selected and the output of the PLA 68 or the address register 63 is selected when the condition discrimination is completed.

Further, the present invention is not limited to these embodiments, but various variations and modifications may be made without departing from the scope of the present invention.

What is claimed is:

1. A direct memory access controller coupled to a system data bus for controlling a data transfer by a direct memory access, said direct memory access controller comprising:

internal bus means for providing a data communication path between elements of the controller;

data handler means, coupled to the system data bus and said internal bus means, for controlling an exchange of data between the system data bus and said internal bus means;

microsequencer means, coupled to said data handler means and said internal bus means, said microsequencer for controlling the direct memory access controller in units of one system clock cycle during one present transfer cycle in accordance with a microprogram;

arithmetic logic unit means, coupled to said internal bus means, for outputting a next transfer address and a byte count which indicates how many bytes of data remain to be transferred;

request handler means, coupled to said microsequencer means, for receiving an external transfer request and for supplying the external transfer request to a programmable logic array means; and programmable logic array means coupled to an output of said microsequencer means, and supplied with the transfer request, transfer mode information and at least portions of the transfer address and the byte count, said programmable logic array means also being coupled to said internal bus means, and is for outputting control information required during a next transfer cycle during one transfer cycle which corresponds to a predetermined number of system clock cycles based on the output of said microsequencer means, wherein data transfers between an input/output device and a memory device is controlled by microprograms of said microsequencer means in cooperation with output signals from said programmable logic array means.

2. A direct memory access controller as claimed in claim 1 wherein said programmable logic array means outputs information instructing a rearrangement of data to said data handler means.

3. A direct memory access controller as claimed in claim 1 wherein said programmable logic array means outputs information indicating whether a next data transfer is related to a transfer process of a source device or a destination device, said source and destination devices respectively being said input/output device and said memory device or vice versa.

4. A direct memory access controller as claimed in claim 1 wherein said programmable logic array means outputs information instructing a repetition of a process which is presently being carried out and supplies this information to said data handler means.

5. A direct memory access controller as claimed in claim 1 wherein said programmable logic array means outputs information for at least calculating a next transfer address and supplies this information to said arithmetic logic unit means.

6. A direct memory access controller as claimed in claim 1 wherein said request handler means includes means for determining priorities of external transfer requests and means for starting an internal process of the direct memory access controller.

7. A direct memory access controller as claimed in claim 1 wherein said programmable logic array means outputs an information indicating an end of a present transfer and supplies this information to said microsequencer means.

8. A direct memory access controller as claimed in claim 1 which further comprises a transfer mode register for storing the transfer mode information which is supplied to said programmable logic array means.

9. A direct memory access controller as claimed in claim 8, which further comprises an a byte count register and a transfer address register respectively for storing the byte count and the next transfer address received from said arithmetic logic unit means, said byte count register and said transfer address register respectively supplying at least portions of the byte count and the transfer address stored therein to said programmable logic array means.

10. A direct memory access controller as claimed in claim 1 wherein said programmable logic array means includes an AND circuit part, an OR circuit part and a timing controller for controlling output of control information from said programmable logic array part responsive to the transfer request.

11. A direct memory access controller as claimed in claim 1 wherein said programmable logic array means has a programmable logic array supplied with input conditions including the transfer request, the transfer mode information and at least the portions of the transfer address and the byte count, said programmable logic array means being coupled to said internal bus and outputting control information required during the next transfer cycle by the random logic during one transfer cycle which corresponds to the predetermined number of system clock cycles, and a state indication circuit coupled to said programmable logic array for renewing information which indicates a next transfer state based on an output of said programmable logic array means and supplies this information to said programmable logic array means as a part of said input conditions.

12. A direct memory access controller as claimed in claim 11 wherein said programmable logic array means outputs an information instructing a rearrangement of data to said data handler means.

13. A direct memory access controller as claimed in claim 11 wherein said programmable logic array part outputs information indicating whether a next data transfer is related to a transfer process of a source device or a destination device, said source and destination devices respectively being said input/output device and said memory device or vice versa.

14. A direct memory access controller as claimed in claim 11 wherein said programmable logic array means outputs an information instructing a repetition of a process which is presently being carried out and supplies this information to said data handler means.

15. A direct memory access controller as claimed in claim 11 wherein said programmable logic array means outputs information for at least calculating a next transfer address and supplies this information to said arithmetic logic unit means.

16. A direct memory access controller as claimed in claim 11 wherein said request handler means includes means for determining priorities of external transfer requests and means for starting an internal process of the direct memory access controller.

17. A direct memory access controller as claimed in claim 11 wherein said programmable logic array means outputs information indicating an end of a present transfer and supplies this information to said request handler.

18. A direct memory access controller as claimed in claim 11 which further comprises a transfer mode register for storing the transfer mode information which is supplied to said programmable logic array means.

19. A direct memory access controller as claimed in claim 18 which further comprises an a byte count register and a transfer address register respectively for storing the byte count and next transfer address received from said arithmetic logic unit means, said byte count register and said transfer address register respectively supplying at least portions of the byte count and the transfer address stored therein to said programmable logic array means.

20. A direct memory access controller as claimed in claim 11 wherein said programmable logic array means includes an AND circuit part, an OR circuit part and a timing controller for controlling output of control information from said programmable logic array means responsive to the transfer request.

21. A direct memory access controller as claimed in claim 1 wherein said programmable logic array means includes an OR circuit supplied with the transfer request and a certain transfer request received from said microsequencer means, said microsequencer means processing the transfer request into the certain transfer request.

* * * * *